Dec. 4, 1945.  R. L. RAPP  2,390,325
FASTENING DEVICE
Filed Nov. 12, 1941   2 Sheets-Sheet 1
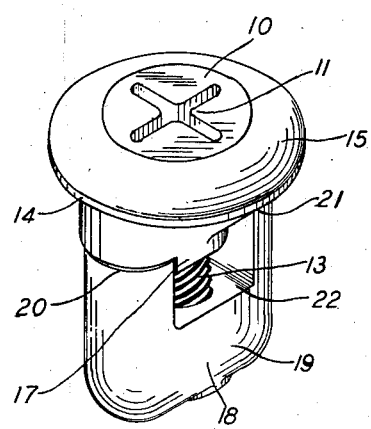
FIG. I
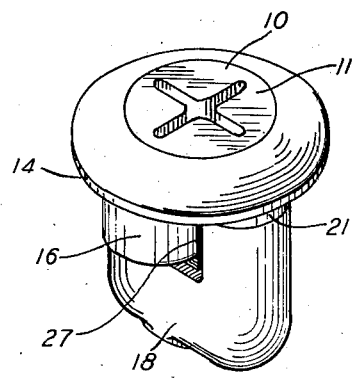
FIG. II
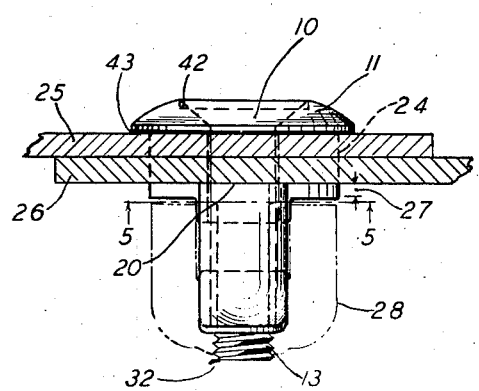
FIG. III
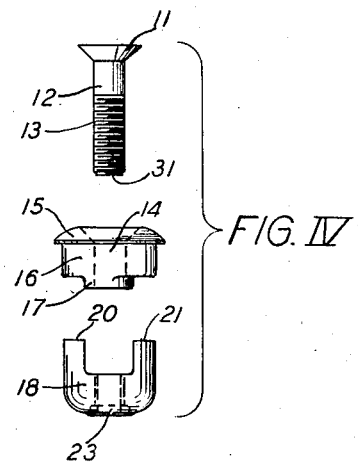
FIG. IV
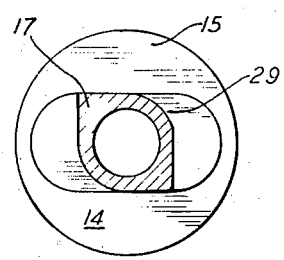
FIG. V
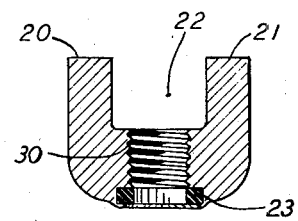
FIG. VI
ROBERT L. RAPP
INVENTOR
BY
George Sullivan Dec. 4, 1945.  R. L. RAPP  2,390,325
FASTENING DEVICE
Filed Nov. 12, 1941  2 Sheets-Sheet 2
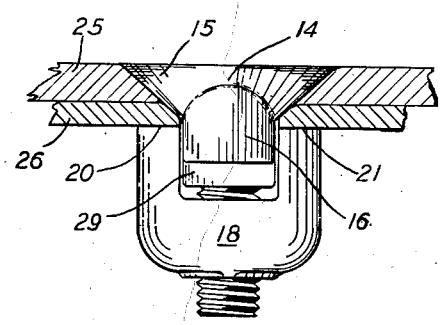
FIG. VII
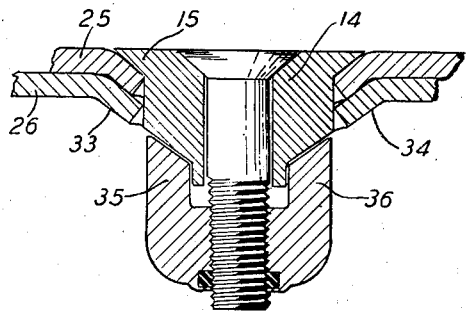
FIG. VIII
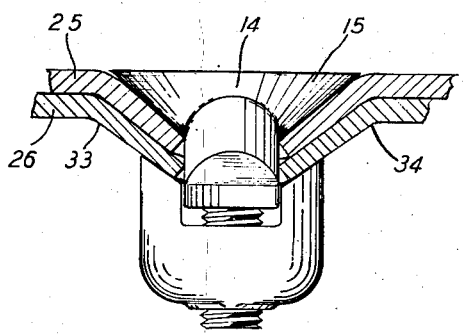
FIG. IX
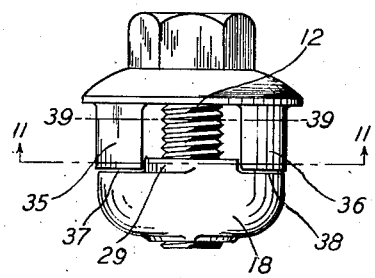
FIG. X
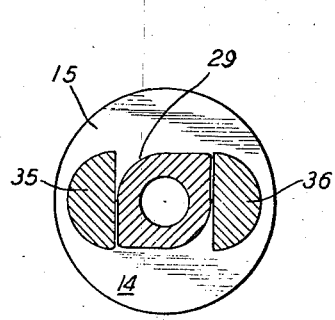
FIG. XI
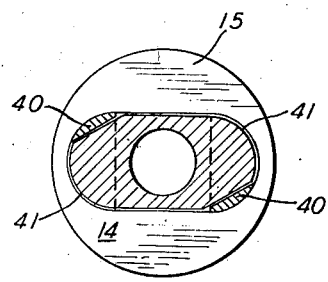
FIG. XII
ROBERT L. RAPP
INVENTOR
BY George Sullivan Patented Dec. 4, 1945

2,390,325

UNITED STATES PATENT OFFICE 2,390,325

FASTENING DEVICE

Robert L. Rapp, Burbank, Calif.

Application November 12, 1941, Serial No. 418,708

4 Claims. (Cl. 85—32)

This invention relates to improvements in fastening devices, and more particularly to fastening devices which may be installed and operated from one side of a structure, more commonly known as "blind" installations. In other words, it is particularly useful as a coupling or fastener to make a connection between members, such as plates or sheets of material, wherein such members are only accessible from one side. My invention is particularly useful as a fastener in an installation wherein a structurally sound attachment is required, that is, where the fastener is to withstand certain loads, such as tension, shear, bending and bearing loads.

The invention is particularly useful when applied to the construction and repair of aircraft, for airplanes usually consist of a number of assembled structures which, in most instances, are required to be readily disassembled in order to provide access to the internal workings for proper maintenance and service as well as repair. The fastener may be used to great advantage in many other industries, such as the automobile, household appliances, farm machinery, heavy equipment, and many others.

It may be said, therefore, that my invention has for its general object the provision of a fastening device which is capable of installations in assembled structures which are accessible from only one side, and where the device is required to carry a load from one part of the structure to another.

It is an object of my invention to provide a fastener which may be made gas or liquid tight, which is particularly useful in the construction and repair of closed assemblies and containers, such as, pressure vessels, fuel tanks and the like.

It is a further object of my invention to provide a fastener having a screw or bolt adapted to operate the device, the fastener being of such a construction that any type of head may be used, such as the common "round" head, the "button" head, the "countersunk" flush type head, the common "raised" type head such as the hexagonal head, and many others. This is very desirable in that it provides an attachment that can be made for any type of surface condition, that is, flush, oval, square or with any artistic design.

A further object of my invention is to provide a fastener which has advantageous features, such as, simple and economical construction, foolproof and self-locking qualities, a construction not requiring a washer under the head to prevent marring the structure, and a construction which will prevent the fastening from working loose as a result of vibration. Also, a pertinent feature of the design is that the construction is so simplified that the unit may be coupled and uncoupled merely by the employment of simple tools such as a screw driver or wrench; the fast operation, ease of operation and simplicity of construction thus making it a unit which may be adapted to mass production and use.

Further objects of my invention will be evident upon reading the following description of the novel parts and combination of parts, all of which contribute to produce an efficient fastening device.

A preferred form of my invention which has been chosen for the purpose of illustration, is described in the following specification, while the broad scope of the invention is pointed out in the appended claims.

Referring to the drawings,

Figure I is a perspective view of one form of my improved fastening device showing the unit assembled and ready for insertion into an opening necessary for the operation of the fastener.

Figure II is a perspective view, similar to Figure I, excepting showing the rotating element in locking position.

Figure III is a side view showing the fastener in clamped relationship with a pair of structural elements.

Figure IV illustrates certain elements of my invention ready to be assembled.

Figure V is a horizontal section through line 5—5 of Figure III, showing a cammed surface to insure practical operation of the fastener.

Figure VI is a vertical section of the rotating element showing one form of friction-increasing means.

Figure VII is a view of a fastener device similar to Figure I, except showing a construction adapted for use in a countersunk, flush-type installation.

Figure VIII is a vertical sectional view of a dimpled sheet, flush-type fastener.

Figure IX is an external view of the fastener of Figure VIII in a clamped position at right angles to the view shown in Figure VIII.

Figure X is a side plan view of an alternate form of fastener shown with an external hexagonal type of head, and in which certain constructions of the rotating element and sleeve have been interchanged.

Figure XI is a horizontal section taken through line 11—11 of Figure X.

Figure XII is a view similar to Figure XI, but showing an alternate form of surface to limit the action of the rotating element.

Before proceeding with the detailed description of my invention, it should be stated that the preferred embodiment of my device comprises three main parts, a bolt, a sleeve and a rotating element. The bolt may be of any type of bolt, screw or rivet with any type of head, the drawings showing the round, button, external hexagonal and the flush type. The flush type is particularly adaptable to the socalled "Phillips" head type of bolt as shown generally in Figures I and II. Likewise, the sleeve may be formed for the various types abovementioned. The rotating element, which according to the drawings may be more commonly termed "nut" may be of any of the various types of nuts now on the market or one particularly designed for this unit. Stampings of spring metal or the like may be used for the nut. The desired design would be such that, in the plan view, it has an elongated shape. It is to be understood that the various types of elements heretofore mentioned may be selected to form any combination in accordance with the requirements of its use.

In general, the fastener is constructed in such a manner that the sleeve and nut may fit into an elongated slot or opening in the structural elements which are to be fastened together. After the unit has been positioned in the slot, a rotative movement of the bolt, by the use of a screw driver or wrench, will rotate the unit approximately ninety degrees into its clamping position. Further movement will screw the nut closer to the head of the sleeve, thus clamping the structural elements, such as plates or sheets of metal, therebetween. By reversing the screw motion, the nut will loosen and rotate into a position substantially in alignment with the elongated portion of the sleeve. Thus, it will be seen that the fastener may be inserted and tightened up or loosened and taken out of the structural elements from one side only of the assembly.

It will be apparent from a study of this description and the accompanying drawings that probably the most interesting and desirable feature of my invention is that the fastener is so constructed that it will carry large structural loads. As an example, referring to Figure III, shear loads along the plane of the joint between the two sheets must actually shear all of the metal inserted in the slot or aperture, which means the summation of the horizontal area of the sleeve and the area of the bolt. In my construction, I prefer to have the bolt fit the bore in the sleeve quite snugly in order to have these two elements to structurally assist one another in carrying the shear loads in the plane of the joint between sheets. It is therefore desirable to fill the slot or aperture with a shear resisting material. It is quite important that the contour of the slot be substantially filled with metal, thus allowing a minimum of slip between the structural members, as well as providing a large amount of shear and bearing material. The fastener is well constructed for tension loads.

In order to insure rotation of the nut and also to resist vibration, I prefer to provide some type of friction-increasing means between the nut and the bolt. A number of different means are now being commonly used. I also prefer to provide means of some type cooperating with either the sleeve or the nut to control the limits of rotation of the nut. The most desired angular rotation is approximately ninety degrees.

Referring to the detail parts as shown by the various drawings, Figures I to V in particular, 10 indicates a bolt having a head 11 and a shank 12 with screw threads 13 thereon. The element 14 which I call a "sleeve" is comprised principally of a head 15 to prevent complete passage of the unit through the opening of a plate, a shank 16 and a rotation control means 17. The rotative element 18 comprises in general, an elongated base 19, clamping faces 20 and 21, a concave portion 22 (in the preferred embodiment) and friction-increasing means 23.

Figure I shows the unit in readiness for insertion into an elongated slot 24 which has been cut into the structural members 25 and 26 (see Figure III) and which in turn are desired to be clamped together. Figure II shows the same unit in clamping position, that is, with the nut 18 rotated approximately ninety degrees, in such a manner that the clamping faces 20 and 21 slide over the shank 16 of the sleeve 14. In this manner, it is seen that the nut 18 is locked with the sleeve 14 because of the overlap 27, thus preventing any possibility of the unit working loose. This self-locking feature is very desirable.

Figure IV represents the elements of one form of my invention and shows the simplicity of the unit and the small number of parts, all ready to be assembled into a completed unit.

Figure III shows the unit in clamping engagement with the structural members 25 and 26 which in this case are two sheets of metal. The sheets 25 and 26 are held rigidly together because of the clamping action between the faces 20 and 21 of the nut 18 and the head 15 of the sleeve 14. The dotted lines 28 illustrate the contour of the nut 18 in the position in which it was inserted into the work. In order to control the rotation of the nut 18, I provide a cammed surface 29 which limits the action of the nut 18 according to predetermined design. I prefer that the nut 18 be allowed to rotate approximately ninety degrees, thus permitting the self-locking feature heretofore mentioned. Figure V discloses the cammed surfaces in detail.

The nut 18 has a threaded hole 30, the threads of which are matched with screw threads 13 of the bolt 10. It is thus seen that the rotation of the nut 18 is predicated upon the friction of the threads between the bolt 10 and the nut 18. This friction is normally sufficient, but in order to insure that the friction is sufficient, I prefer to provide a friction-increasing means 23, which in the illustrated case is represented by an insert which may be made of fiber, rubber, leather, soft metal or the like. After assembly of the unit, the end 31 of the bolt 10 may be peened to prevent loss of the nut 18 as shown at 32. I have found that the peened end and the normal friction of the threads without the insert is a workable combination, however, I prefer the use of an insert, especially where the unit is used in aircraft installations. It is to be understood that many other types of friction-increasing means may be used in lieu of the insert principle. Figure VI discloses the details of the illustrated insert means.

In many installations, especially on the exterior surfaces of aircraft, a flush-type fastener is desired. Figure VII shows a flush-type unit designed for use with countersunk sheets. In this version, the clamping faces 20 and 21 are horizontal with respect to the sheets, however, in the units portrayed by Figures VIII and IX which are designed for dimpled sheets, it will be noted that the clamping faces are inclined in accordance with the degree of dimpling. The sheets 25 and 26 are dimpled, that is, bent inward around the aperture, to provide a concave surface for the insertion of the head 15 of the sleeve 14, thus allowing the unit as a whole to be flush mounted. In this construction, the clamping faces 20 and 21 are preferably designed on an angle so that a tight and even-bearing fit will be made with the dimpled portions of the sheets as shown at 33 and 34.

This invention may be readily varied in construction details in order to subscribe to the many different uses and installations. As an example, Figures X and XI illustrate a slightly modified form or type of construction in that some of the distinguishing features of the previously described sleeves and nuts have been interchanged. For instance, it will be noted that the protruding members forming the clamping surfaces 20 and 21 of Figures I to V have been adapted to the sleeve member as shown at 35 and 36. In this construction, the nut 18 has the cammed surface 29 integral therewith and the clamping faces are recognized at 37 and 38. This type of construction may be advantageous for production reasons and for lightness in weight. It is, however, not as structurally sound as previously described types as it is readily seen that the shear area along the line 39—39 is of a smaller magnitude and there is little cooperation between the members 35 and 36 and the bolt shank 12 due to spaces surrounding the bolt. As an example of the many different types of bolt heads that can be used I have shown in this view a standard hexagonal type adapted for use with a wrench. Figure XI is a sectional view of the unit of Figure X taken along the line 11—11 showing the members 35 and 36 and the cammed surface 29. Figure XII is a similar view to disclose an alternate rotation control means, in which the abutments 40 restrict the movement of its corresponding nut which has a general contour as outlined by the lines 41.

This construction is particularly advantageous as it may be made liquid or gas tight by the insertion of gaskets or the like at the proper points. For instance, referring to Figure III, gaskets or other sealing means may be employed at 42 and 43, thus accomplishing the desired result. It is apparent that my invention is readily usable in replacing standard nut and bolt combinations wherein the nut must be secured to the back plate, especially when the nut must be used in an inaccessible position.

It is to be understood that the embodiments of the invention described herein, is only one of the many embodiments this invention may take, and I do not wish to be limited in the practice of the invention, nor in the claims to the particular embodiments set forth. It is apparent that numerous changes in construction and rearrangements of the parts may be resorted to without departing from the scope of the invention as defined by the claims.

I claim as my invention:

1. A fastening device comprising a sleeve, headed bolt and nut, the sleeve having a laterally enlarged head providing an engaging shoulder from which extends a shank elongated in cross section with a projection constituting stops to prevent rotation of the nut more than about 90° and a smooth bore through the head and shank, the bolt shank positioned in the bore, extending beyond the sleeve shank and threaded into the nut, the nut being of the same cross section as the sleeve shank and turned normally in line therewith, having a projection and stops to engage those of the sleeve shank and a work engaging face on each side of the bore, so that when the bolt is turned to tighten, the work engaging faces swing clear of the sleeve shank and the nut and sleeve telescope to tightened position.

2. A fastening device as defined in claim 1 in which the projection on the sleeve shank is around the bore and the work engaging faces of the nut are each on the end of a projecting lug.

3. A fastening device as defined in claim 1 in which the projection on the sleeve is defined by a recess laterally through the narrow center of the shank and the work engaging faces of the nut are below the level of its projection.

4. A fastening device comprising a sleeve, headed bolt and nut, the sleeve having a laterally enlarged head providing an engaging shoulder from which extends a shank elongated in cross section with a projection comprising stop means to prevent rotation of the nut more than about 90° and a smooth bore through the head and shank, the bolt shank positioned in the bore and extending beyond the sleeve shank and threaded into the nut, the nut being of substantially the same cross section as the sleeve shank and turned normally in line therewith, having a projection and stop means to engage that of the sleeve shank and a work engaging face on each side of the bore, so that when the bolt is turned to tighten, the work engaging faces swing clear of the sleeve shank and the nut and sleeve telescope to tightened position.

ROBERT L. RAPP.